WILLIAMS & PAGE.
Car Lamp.
No. 2,678. Reissued July 9, 1867.
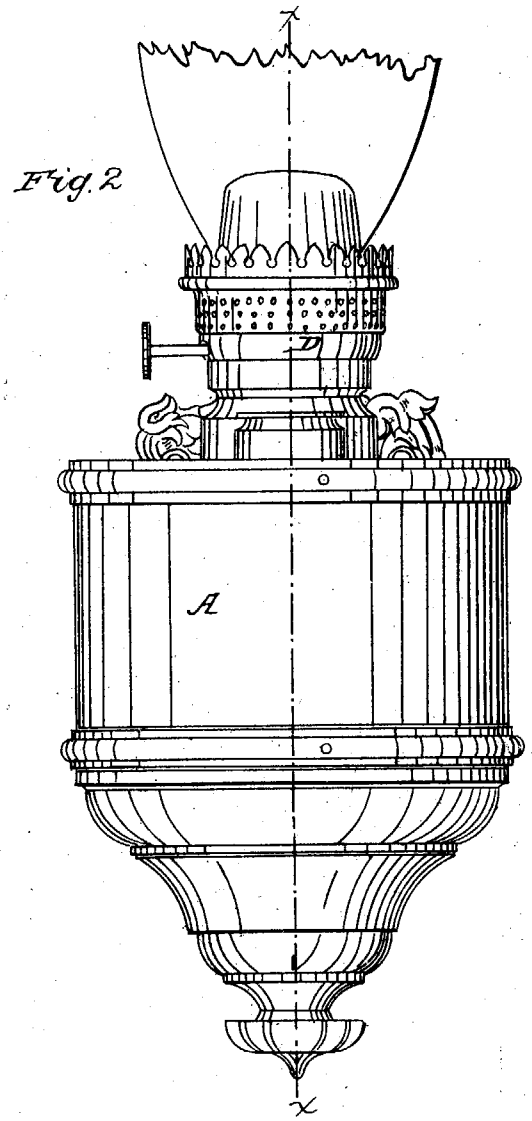
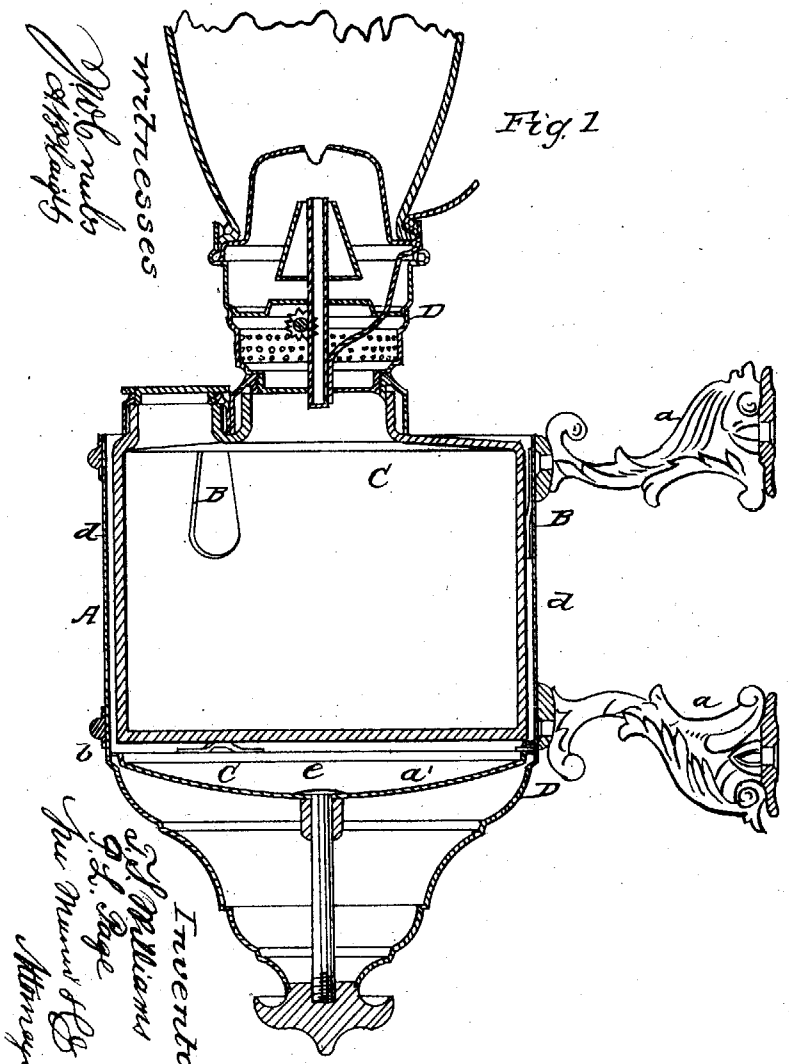
N. PETERS, Photo-Lithographer, Washington, D. C.

United States Patent Office.

THOMAS S. WILLIAMS AND P. S. PAGE, OF BOSTON, MASSACHUSETTS.

*Letters Patent No.* 38,620, *dated May* 19, 1863; *reissue No.* 2,678, *dated July* 9, 1867.

IMPROVEMENT IN LAMPS.

The Schedule referred to in these Letters Patent and making part of the same.

TO ALL WHOM IT MAY CONCERN:

Be it known that we, T. S. WILLIAMS and P. S. PAGE, of Boston, in the county of Suffolk, and State of Massachusetts, have invented a new and improved Lamp Design, for use in railroad cars, steamboats, etc., etc.; and we do hereby declare that the following is a full, clear, and exact description thereof, reference being had to the accompanying drawings, making a part of this specification, in which—

Figure 1 is a vertical section of our invention, taken in the line *x x*, fig. 2.

Figure 2, an external view of the same.

Similar letters of reference indicate corresponding parts in the two figures.

The object of this invention is to obtain a lamp for railroad cars, steamboats, etc., etc., which will prevent the escape or overflow of oil, which may be readily removed for the purpose of cleaning, filling, etc., and which will be firmly retained in position while in use.

The invention consists in the employment or use of a socket or case, which receives the fountain or reservoir of the lamp, the fountain or reservoir being retained properly in the socket by means of springs or guides, and the bottom of the fountain or reservoir resting on projections, so as to admit of the oil which overflows from the lamp passing down into the bottom of the socket or case.

To enable those skilled in the art to fully understand and construct our invention, we will proceed to describe it.

A represents a case or socket, which may be constructed of metal, and of cylindrical form, and having brackets *a* attached to it, by which it is secured to the fixture designed to support it. The bottom *a'* of this case or socket is of concave form, as shown in fig. 1, and at the edge of the bottom *a* there is a horizontal ledge, *b*, which extends all around it, and has projections *c* attached to it, three or more of the latter being used, and placed at any convenient distances apart. In the upper part of the case or socket A there are attached springs or guides B, which may be simply elastic or fixed plates attached to the inner side of the socket, or outer side of the fountain, or both. These springs are bent or curved so as to project outward a short distance from the inner socket, as shown clearly in fig. 1; or fixed guides may be used instead of springs. C represents the fountain of the lamp, which may be of glass, metal, or other suitable material or materials. This fountain is of cylindrical form, or of a form corresponding to that of the case or socket A, and of such diameter as to press snugly against the springs B when fitted in the socket, or to be held by fixed guides or supports on the socket or fountain. The lower end of the fountain rests on the projections *c*, and the upper end of the fountain is about flush with the top of the socket.

The fountain may be provided with the usual coal-oil or any other suitable burner D. Instead of the springs B, fixed guides or bearings may be used. These, however, would be equivalents of the springs, and may be attached to the socket or the fountain, or to both. The springs B or guides retain or hold the fountain C snugly within the case or socket A, preventing it from rattling or jarring therein, while the oil that overflows from the fountain is allowed to pass down the space *d* between the fountains and the case, and underneath the fountain into the receptacle *e* formed by the concave bottom *a*. The projections *c* admit of the oil passing underneath the fountain, as they keep it a little distance up from the ledge *b*. If the fountain rested directly upon the said ledge the oil could not pass down into the chamber below it. The fountain it will be seen may be readily fitted into and removed from the case or socket A for the purpose of filling, cleaning, etc., etc., and no drip oil will be drawn out from the case or socket A, as the former will all settle down into the chamber formed by the concave bottom *a'*, and a person sitting underneath the lamp will be perfectly protected from drip oil, as none can pass over the upper edge of the case or socket.

Having thus described our invention, what we claim as new, and desire to secure by Letters Patent, is—

1. The case or socket A, in combination with a railroad-car lamp or lamp fountain, C, substantially as and for the purpose specified.

2. The springs B, or equivalent guides or bearings, arranged between the lamp or lamp fountain, and attached to either, substantially as and for the purpose set forth.

3. Projections *c*, arranged in the case or socket A, substantially as and for the purpose specified.

THOS. S. WILLIAMS,
P. S. PAGE.

Witnesses:

ALLAN J. CHASE,
ALFRED E. COX.